Jan. 12, 1954

W. H. BANCROFT, JR
AIRCRAFT CONTROL SYSTEM FOR OPERATING
AUXILIARY POWER SOURCE AT TAKE-OFF 2,665,860

Filed July 14, 1951

WILLIAM H. BANCROFT jr.
INVENTOR.

BY S. Tierney Jr
ATTORNEY

Patented Jan. 12, 1954

2,665,860

UNITED STATES PATENT OFFICE 2,665,860

AIRCRAFT CONTROL SYSTEM FOR OPERATING AUXILIARY POWER SOURCE AT TAKE-OFF

William H. Bancroft, Jr., Valley Center, Calif., assignor to Rohr Aircraft Corporation, Chula Vista, Calif., a corporation of California Application July 14, 1951, Serial No. 236,799

13 Claims. (Cl. 244—58)

This invention relates to an aircraft control system in which an auxiliary power source is utilized to assist the main power source of an airplane at take-off.

An object of the invention is to provide an auxiliary power source on an airplane having two or more engines which will be automatically operated and supply sufficient auxiliary power to establish a positive rate of climb at take-off in case of partial or complete failure of one or more engines during any phase of the take-off and moving at a speed above that at which the plane could safely be stopped.

Another object is to provide a means within convenient reach of the pilot and copilot which may be a manually operable means whereby the auxiliary power source may be rendered operative at any speed of the airplane which the pilot selects as the plane moves down the runway.

Another object is to provide a control means which takes in account the gross weight of the airplane, the runway length, and the altitude of the airfield to automatically determine the speed below which it is safe for the pilot to stop the plane on the runway and above which the take-off must be continued.

Another object is to provide a manually operable means whereby, if the airplane is carrying a heavy load or take-off conditions are adverse, the pilot may select the speed at which the thrust of an auxiliary power source may be made automatically effective to assist the take-off whether engine failure occurs or not.

Another object is to provide an electrical circuit for initiating the operation of the auxiliary power means and a grounded mechanical shield for the circuit to prevent a stray live wire from touching it and accidentally causing the operation of the auxiliary power means.

A further object is to provide a visual signal to the pilot that the airplane moving on the runway has reached a speed at which it cannot safely be stopped and that he must continue the take-off.

Another object is to provide a visual signal to the pilot which indicates which engine of a multi-engine airplane has failed or partially failed.

A still further object is to provide a visual indicating means which indicates to the pilot that an airplane, which is not operating properly is moving at a speed at which it can still be safely stopped on the runway and that he should therefore stop his take-off.

Another object is to provide a warning signal to the pilot before take-off that the circuit which controls the auxiliary power source is energized and that if it is automatically or manually closed, it will cause the power source to operate.

A further object is to provide electrical means for securing the aforementioned objects by running only a single extra wire through the airplane fuselage.

Further objects will become apparent as the description of the system proceeds. For a better understanding of the invention, reference is made to the accompanying drawings, in which.

In taking off an airplane on a runway of normal length, a velocity is soon reached below which the pilot may safely bring the plane to a stop on the runway but above which the take-off must be continued since it is not possible to bring the plane to a stop on the remaining portion of the runway. It is desirable that some indicating means be available to warn the pilot automatically when this critical speed has been reached so that he may bring the plane to a stop or continue the take-off as conditions warrant.

If the length of the runway is shorter, it is desirable that the pilot be warned that a velocity has been reached above which the plane may not be safely brought to a stop. This warning is also desirable if the airfield is at a considerable elevation above sea level since in the latter case, a longer run is necessary to get the plane airborne.

It is also desirable that the airplane be provided with an auxiliary power source capable of giving added thrust to the airplane to assist its take-off and that this auxiliary power source become effective soon after the pilot has received the aforementioned warning in order to insure a safe take-off. Since the pilot has several matters engaging his attention at take-off, it is preferable that the auxiliary power source be rendered effective automatically.

If the pilot notices that added thrust is not supplied promptly by automatic operation of the auxiliary power source, it is desirable that a manual device, under control of the pilot be provided, to insure instant operation of the auxiliary power source. Or under certain conditions as, for example, taking off from a field that is not smooth, the pilot may wish to utilize the thrust of the auxiliary power source soon after starting the take-off and before the plane has attained a high speed in order to get off the ground quickly.

Since operation of the auxiliary power source is preferably initiated electrically, precautions should be taken that the electrical circuit which initiates its operation should be protected against stray voltages or live wires while the airplane is at rest on an airfield or undergoing repair in a hangar.

In the case of a two engine airplane, and one engine should fail or partially fail to function after the plane has reached a place on the runway where it cannot safely be stopped, it is desirable that thrust from the auxiliary power source be immediately applied whether the plane is still on the ground or is air-borne.

In starting an airplane having four or more engines it is desirable that the pilot be able to select before take-off whether he wants the added thrust of the auxiliary power source to be applied should one engine fail or whether it is to be applied only after two or more engines have failed. This invention provides means for meeting the above requirements in a manner now to be described in detail.

Figure 1:
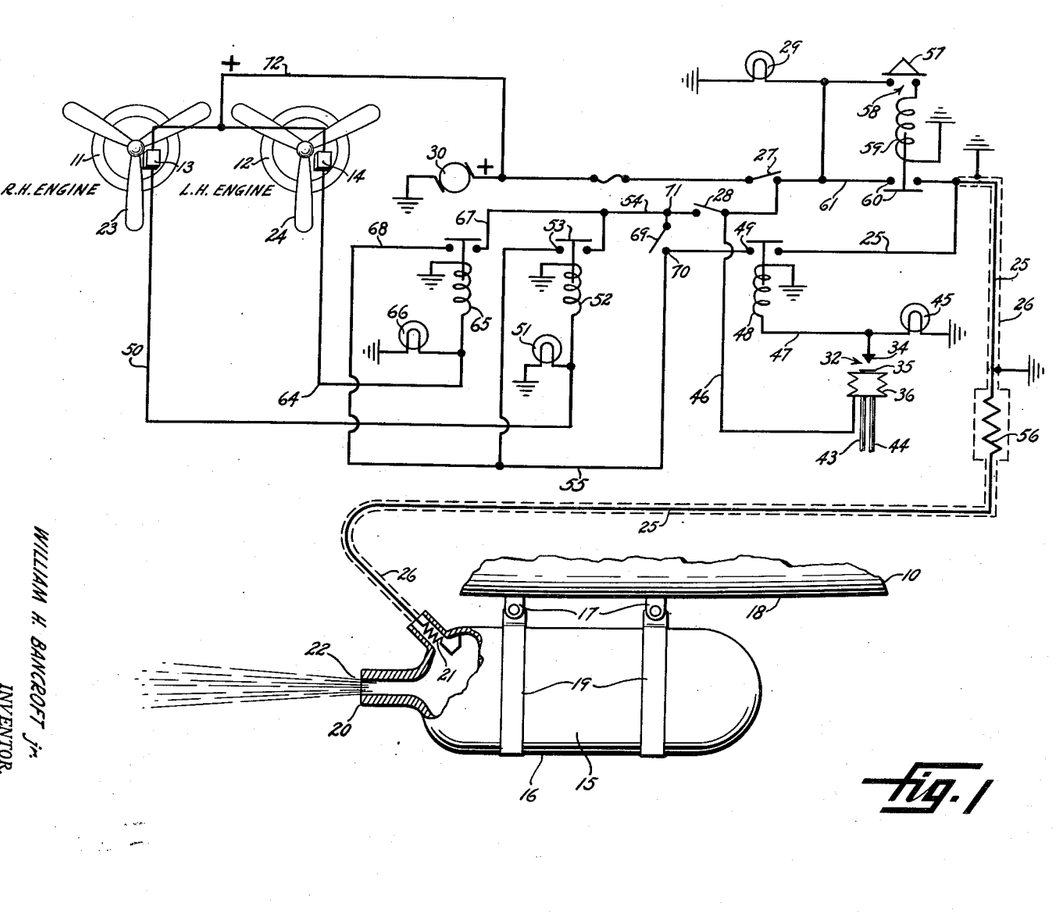
Figure 1 is a side view showing a portion of an airplane and a schematic wiring diagram of a system embodying the invention applied to a twin reciprocating engine airplane.

In Figure 1 the invention is shown as applied to an airplane 10 having right and left hand reciprocating engines 11, 12 each engine having an oil actuated electrical torque switch 13, 14 which opens when the engine speed is above a predetermined value. The auxiliary power source 15 illustrated is a solid propellant contained in an elongated vessel 16 secured to a pair of brackets 17 on the bottom 18 of the airplane fuselage by means of a pair of clamps 19 which embrace the vessel. Vessel 16 has a nozzle opening 20 and contains an igniting resistor 21 which, upon being heated by an electric current, ignites the charge, the combustion gases issuing from nozzle 20 as a powerful jet 22, which supplies large added thrust to augment that of the propellers 23, 24 driven by the engines at take-off. One side of resistor 21 is grounded and heating current is supplied through a wire 25 which is entirely enclosed within and mechanically protected by a grounded shield 26. It is a main feature of the invention to provide both automatic and manually controlled means for starting the flow of current through wire 25 at a desired and favorable time during take-off.

Figures 2, 3, 4:
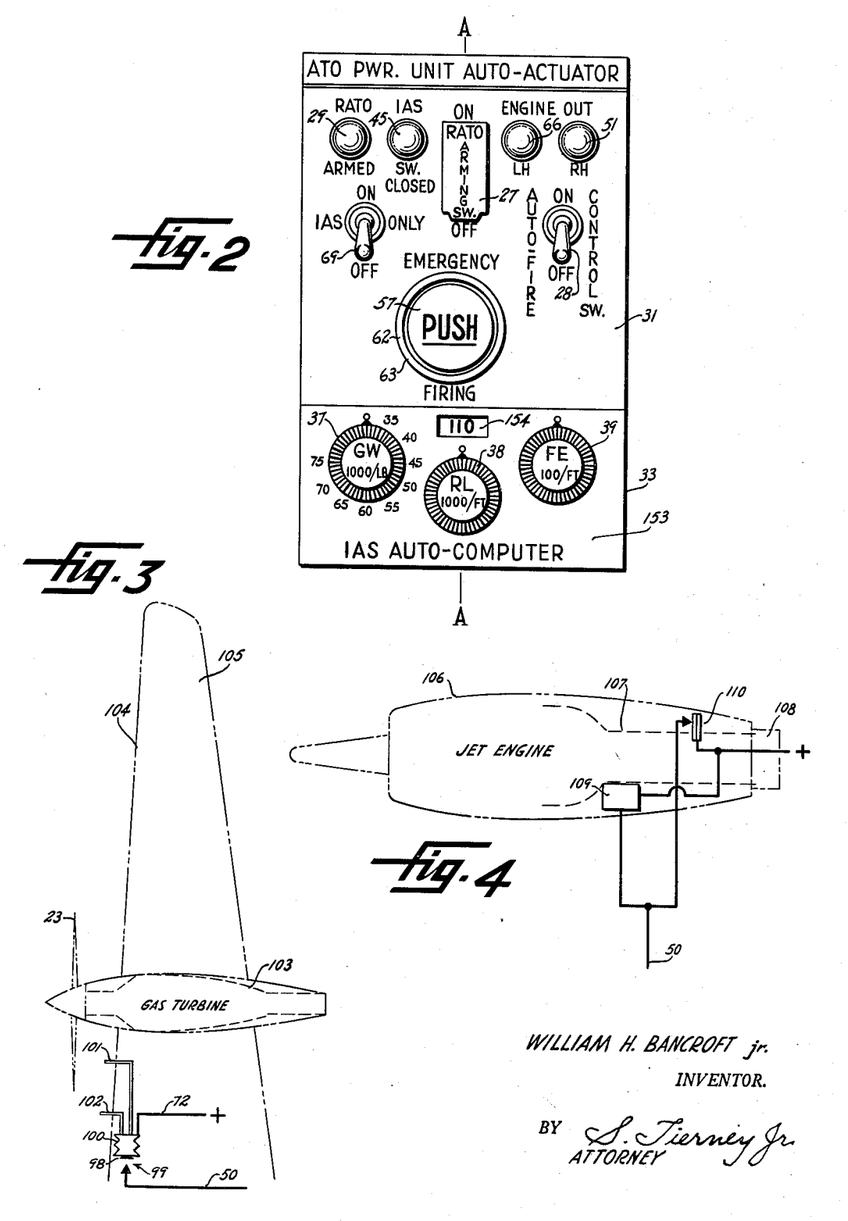
Figure 2 is a view looking toward the front of the airplane showing a panel and certain controls used in the system.
Figure 3 shows on a reduced scale a portion of an airplane having a turbo-prop drive and a portion of the associated electrical control system.
Figure 4 is a plan view of a jet airplane drive and a portion of the associated electrical control system.

In case the pilot wishes thrust from power source 15 only in case of engine failure at take-off, prior to take-off he closes switches 27 and 28, which causes lamp 29 to light. This is an indication that electrical generator 30 is functioning properly and that power is available to actuate power source 15. Lamp 29, switches 27, 28 and other controls to be described are mounted on a panel 31 which is disposed crosswise of the airplane just in front of and between the pilot and co-pilot, preferably in or adjacent to the vertical plane A—A through the center line of the airplane fuselage. An automatic computing pressure actuated switch 32 is mounted in a casing 33 at the base of panel 31, this switch having a pair of movable contacts 34 and 35, contact 35 being supported by a metallic bellows 36. Before take-off the pilot adjusts the distance between contacts 34 and 35 by means of three dials 37, 38, and 39 which are attached to the ends of shafts 40, 41, and 42 respectively (see Figure 5). The dial 37 has scale graduations in units of weight which cover the range of take-off gross weights of the airplane, dial 38 is graduated in feet representing length of the runway and dial 39 is graduated in feet representing elevation of the airfield. The pilot sets dial 37 at a reading corresponding to the take-off gross weight of his plane, dial 38 at a reading equal to the length of the runway and dial 39 at a reading equal to the elevation of the airfield. Bellows 36 is operated by pressure from a pair of tubes 43, 44, whose other ends are connected to the Pitot-static pressure source (not shown) of the airplane. The tubes thus provide two alternate paths to connect such source to the bellows, either of which is effective in case the other becomes cut off or blocked up for any reason. The bellows is thus expanded by the pressure differential between the pressure supplied to it through one or both of the tubes and the ambient pressure. The increase in the dynamic pressure due to an increase in the airplane speed therefore causes an extension of bellows 36.

An indicating lamp 45 is provided which is not lighted as the airplane accelerates down the runway, thus serving as an indication to the pilot that, in event of engine failure, he may still bring the plane to a safe stop on the runway. When a certain speed, hereinafter designated by the symbol V has been reached, it is no longer possible to bring the plane to a safe stop and the take-off is continued even if one engine should fail. When speed V is reached, bellows 36 closes switch 32 thus establishing a circuit from generator 30 through switch 27, wire 46, bellows 36, switch 32, and wire 47 to lamp 45. The lighting of lamp 45 indicates to the pilot that the take-off must be continued and if both engines continue to operate properly, he continues the take-off in the normal way, the auxiliary power source 15 not being needed or used. Current through wire 47 also actuates relay 48 thus establishing a connection between its switch contact 49 and wire 25.

If one engine, for example, engine 11 should now fail or partially fail so that its speed decreases substantially either when the plane is still on the runway or is air-borne, this will cause torque switch 13 to close, causing current to flow through wire 50 to lamp 51. The lighting of this is an indication to the pilot that the right hand engine has failed and that he may expect added thrust from power source 15 very soon. The current through wire 50 also operates relay 52, the closure of whose contacts 53, causes current to pass through wire 54, contacts 53 and wire 55 to contact 49, wire 25, protective resistor 56 and igniting resistor 21. Upon the discharge of auxiliary power source 15, the thrust of its jet 22 is immediately available to establish a rate of climb sufficient to get the airplane at an altitude where the pilot can continue the flight or turn and land on the runway.

If very soon after the pilot sees lamp 51 light up, he does not notice a large increase in the rate of climb, he will know that the automatic firing system described has not operated properly. He then immediately presses manual firing button 57 which closes switch 58 and causes relay 59 to operate. The closure of relay switch contacts 60 causes current to flow through wire 61, contacts 60 and wire 25, fire charge 15 and thus secure a safe take-off. A protective shield 62 is mounted on panel 31 around button 57, the shield having a rim portion 63 which projects a substantial distance beyond the face of the button, thus serving to prevent accidental operation of the button by contact with a person's body or a foreign object, such as a tool being used by a repairman or manuals carried by a crew member.

If the left-hand engine 12 fails during take-off, the torque switch 14 will automatically close and cause current to flow through wire 64 and actuate relay 65, at the same time causing lamp 66 to light. This warns the pilot of the failure of the left-hand engine and that, provided speed V has been reached, added thrust from auxiliary power source 15 will be effective very soon. Operation of relay 65 causes current to pass through wires 54, 67, 68 to wire 55 and fire charge 15 in the manner above described, the added thrust of jet 22 achieving a safe take-off. To relate the circuit of Figure 1 to that of Figure 4, the fixed contact of switch 69 is designated as 70, the terminal on wire 54 as 71, and the current supply wire to switches 13 and 14 as 72.

Under certain circumstances, as when the airplane is considerably overloaded or the runway is shorter than normal length, the pilot may wish the added thrust of jet 22 to become effective as soon as the speed of the plane has reached velocity V, irrespective of engine failure. Before take-off, he sets dials 37, 38 and 39 and then closes switches 27, 28 and 69 thereby applying the potential of generator 30 directly to switch contact 49 and by-passing the engine failure signalling portion of the circuit. As soon as speed V is reached, switch 32 closes and causes relay 48 to be operated. Current then passes through its contacts and wire 25 to fire charge 15 and to light lamp 45, as above described.

The voltages and Pitot-static pressures necessary for the operation of the apparatus described are available in the cockpit, the only extra wire which has to be run through the fuselage is the shielded wire 25 extending to igniting resistor 21.

Figure 10:
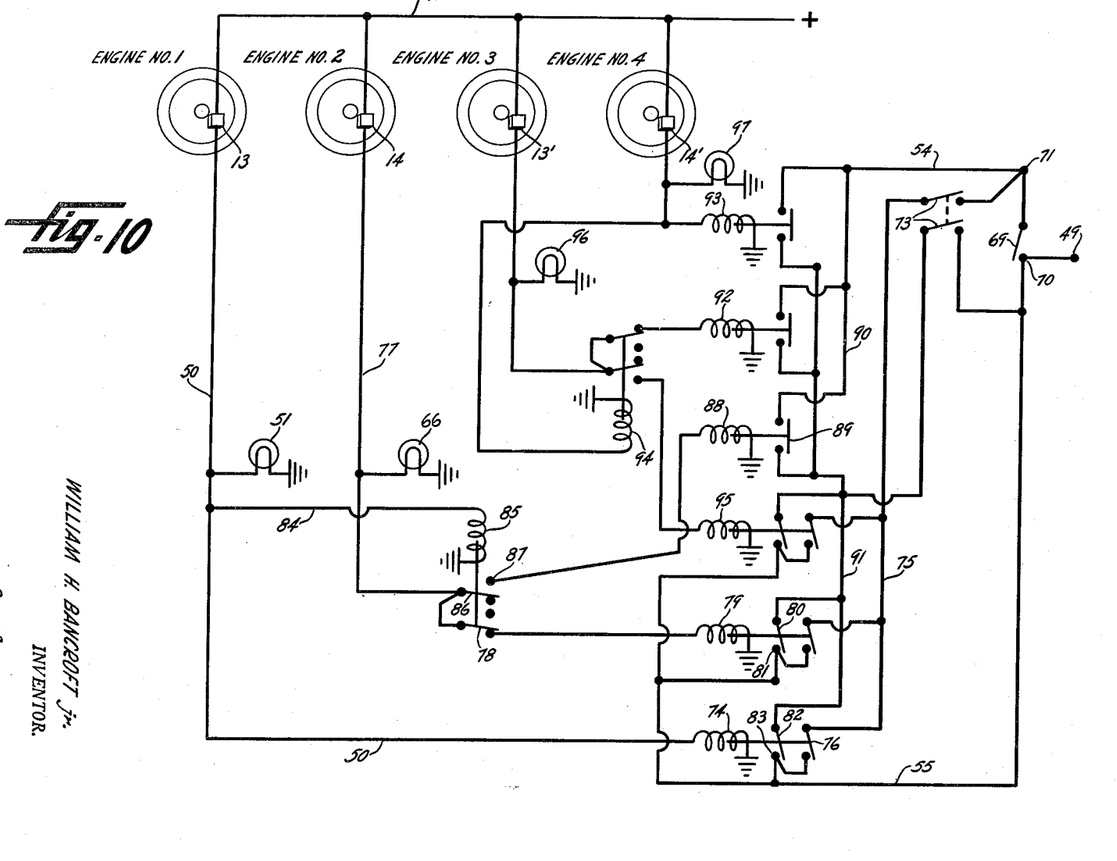
Figure 10 is a schematic wiring diagram of the system as applied to a four engine airplane drive of the reciprocating engine type.
Figure 11:
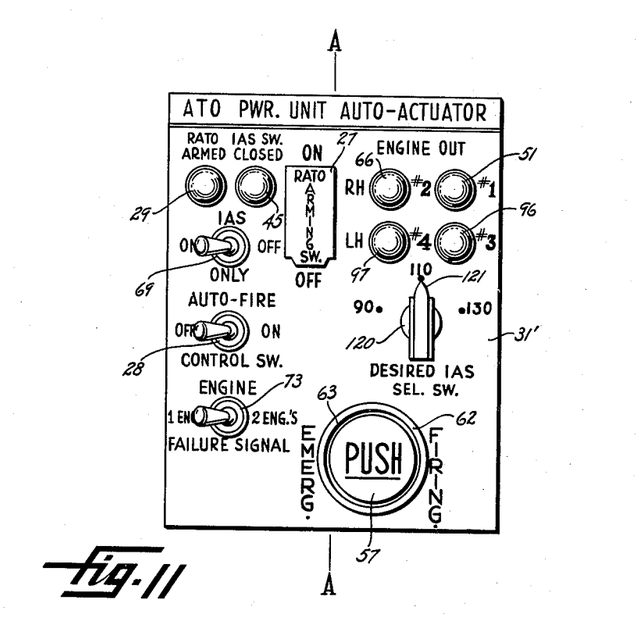
Figure 11 is a view looking toward the front of the airplane showing a panel and controls used with the wiring system of Figure 10.

Figures 10 and 11 show the invention as applied to an airplane having four reciprocating engines, corresponding parts being designated by the same reference numerals as in Figure 1 and portions of the circuit connected to relay contact 49 and terminal 71 of Figure 1 not being illustrated as they are identical with those of Figure 1. The system provides manual control means whereby the pilot may select to fire charge 15 at any speed on the runway and also automatic means whereby the charge may be fired after the failure of any one engine or not be fired until two engines have failed. Among the factors considered by the pilot in making this selection are gross weight of airplane, length of runway and altitude of airfield. If the pilot wishes the charge fired automatically upon the failure of any one engine, he closes switches 27, 28 and double pole, single throw switch 73 just prior to take-off. Upon the failure of any engine as, for example, No. 1, current passes through torque switch 13, wire 50 and lights lamp 51, indicating to pilot the failure of No. 1 engine. Current through wire 50 actuates relay 74, causing current to pass through wire 75, switch blade 76 and wire 55 to contact 49 and fire charge 15 if speed V has been reached. If this speed has not been reached the pilot may stop the plane safely on runway.

If the pilot elects to have charge 15 fired only after two engines have failed, just prior to take-off he closes switches 27, 28 and sets switch 73 to the open position shown in Figure 10. Assuming engine No. 2 to fail first, the closure of its torque switch 14 causes current to pass through wire 77, switch blade 78 and actuate relay 79, thus moving its switch blade 80 into engagement with contact 81. The failure of engine No. 2 is automatically indicated to the pilot by the lighting of lamp 66. Upon the subsequent failure of engine No. 1, the closure of its torque switch 13 causes current to pass through wire 50 and actuate relay 74, whose switch blade 82 is moved into engagement with contact 83. The lighting of lamp 51 is an indication to the pilot that engine No. 1 has failed. Current also passes through wire 84 and actuates relay 85, causing its switch blade 78 to interrupt the circuit through relay 79 and its switch blade 86 to engage contact 87. This causes current to actuate relay 88, closing its switch 89 which in turn causes current to pass from wire 54, through wire 90, switch 89, wire 91, switch blade 82, contact 83, wire 55 and contact 49 and fire charge 15 if speed V has been reached. If this speed has not yet been reached, the pilot may stop the plane on the runway. From the above description, it is believed that the circuits established to fire charge 15 upon the failure of No. 3 and No. 4 engines will be apparent, relay 92 corresponding to relay 79, relay 93 corresponding to relay 74, relay 94 to relay 85 and relay 95 to relay 88. Upon failure of engine No. 3 lamp 96 will automatically light and upon failure of engine No. 4 lamp 97 will light.

If the propellers of the airplane are driven by turbines instead of engines of the reciprocating type, the torque switches are replaced by switches of the type shown in Figure 3 in which the movable contact 98 of switch 99 is secured to a bellows 100 which is responsive to the differential pressure set up by tubes 101 and 102. Propeller 23 is shown as being driven by gas turbine 103 and the end of tube 101 is located at the leading edge 104 of a wing 105 and within the airstream from the propeller. The end of tube 102 is also located at the leading edge of the wing but outside of the airstream set up by the propeller. Switch 99 otherwise operates the same as torque switch 13 to make and break the connection between wires 72 and 50.

When the plane is driven by jet engines such as 106 of Figure 4, having a combustion chamber 107 and discharge nozzle 108, the torque switches described are replaced by a pressure actuated switch 109 and a thermal actuated switch 110, both of which are normally open. Switch 109 has a movable portion responsive to the pressure within chamber 107 and closes the switch in response to a drop in pressure due to engine failure. The thermal responsive element of switch 110 is disposed in nozzle 108 and operates to close the switch in response to fall in temperature caused by engine failure. The closure of either or both switches causes the flow of current from wire 72 to wire 50 and fire charge 15, as above described in case of engine failure.

Figures 7, 8:
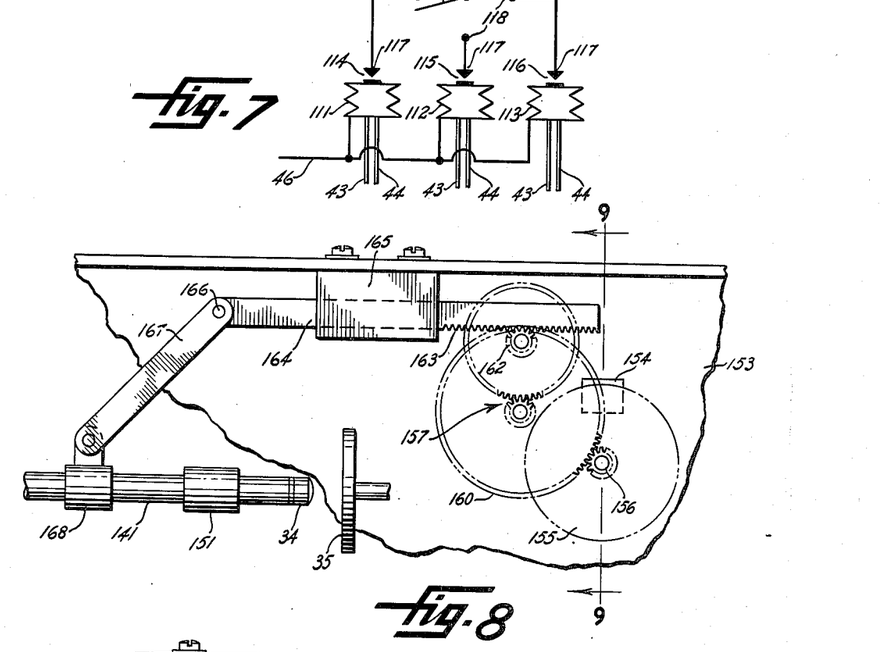
Figure 7 is a schematic view of a manually operated control switch which may be used instead of the switch of Figure 5.
Figure 8 is a view looking toward the rear of the panel of Figure 2 of an indicator device which may be used with the switch of Figure 5.

Figures 7 and 11 show a switching arrangement which may be substituted for the auto computer switch 32 of Figure 1. In this arrangement there is no manual adjustment of the switch contacts, three bellows 111, 112 and 113 being provided and actuated by the Pitot-static pressures from tubes 43, 44. The bellows are arranged to close their switches 114, 115 and 116 at different speeds of the airplane as, for example, 90, 110 and 130 knots. The upper switch contacts 117 are connected to terminals 118 mounted on the rear of panel 31', a rotatable contact arm 119 being provided to engage either terminal. The contact arm is actuated by a control knob 120 mounted at the front of the panel which is provided with a pointer 121. The front of the panel is marked with airspeed indications to which pointer 121 may be set. The several switches and lamps described are mounted on panel 31' which is disposed in or adjacent to plane A—A. Just before take-off, the pilot sets pointer 121 at the airspeed at which he wishes charge 15 to be fired as, for example, 110 knots. When the plane reaches this speed on the runway, the Pitot-static pressure on bellows 112 causes switch 115 to close and cause current to flow from wire 46 to wire 47 and fire charge 15 as above described. Lamp 45 is also lighted and functions as above described. This arrangement provides means within easy reach of the pilot and copilot whereby he may select the airplane speed at which he wishes the thrust from auxiliary power source 15 to become effective in assisting the take-off.

*Automatic computing switch*

Referring to Figures 5, 6, 8 and 9, the construction of switch 32 for correlating velocity V to the gross weight, runway length and elevation of the airfield is shown, the construction of this switch being claimed in a divisional application, Serial No. 246,436, filed September 13, 1951, now abandoned. Switch contact 35 is supported by a rod 122 secured to one end of bellows 39 whose opposite end is supported on a slide 123 which is slidable along a pair of guide rails 131' integral with slide 131, an insulating gasket 124 being secured between the bellows and slide 123. Current supply wire 46 is connected to the metal bellows in any suitable way. Slide 123 has a depending lug 125 which receives the reduced end portion 126 of a threaded shaft 127 having a pin and slot connection 128 with drive shaft 129. The thread of shaft 127 engages a threaded opening in vertical wall 130 of a second slide 131 which is slidable along a pair of guide rails 132 secured to a side 133 of casing 33. Shaft 129 is driven by dial 39 through the shaft 42, bevel gears 134 and worm gearing 135 so that rotation of dial 39 causes movement of switch contact 35 and slide 123 while slide 131 remains stationary. Slide 131 is driven by an eccentric 136 secured to shaft 41, the eccentric being connected to a lever 137 by a pitman 138, the lever being supported by a pivot shaft 139. A link 140 connects one end of the lever to one end of slide 131. Rotation of dial 38 thus adjusts the position of slides 131 and 123 and the spacing between switch contacts 34 and 35.

Figures 5, 6:
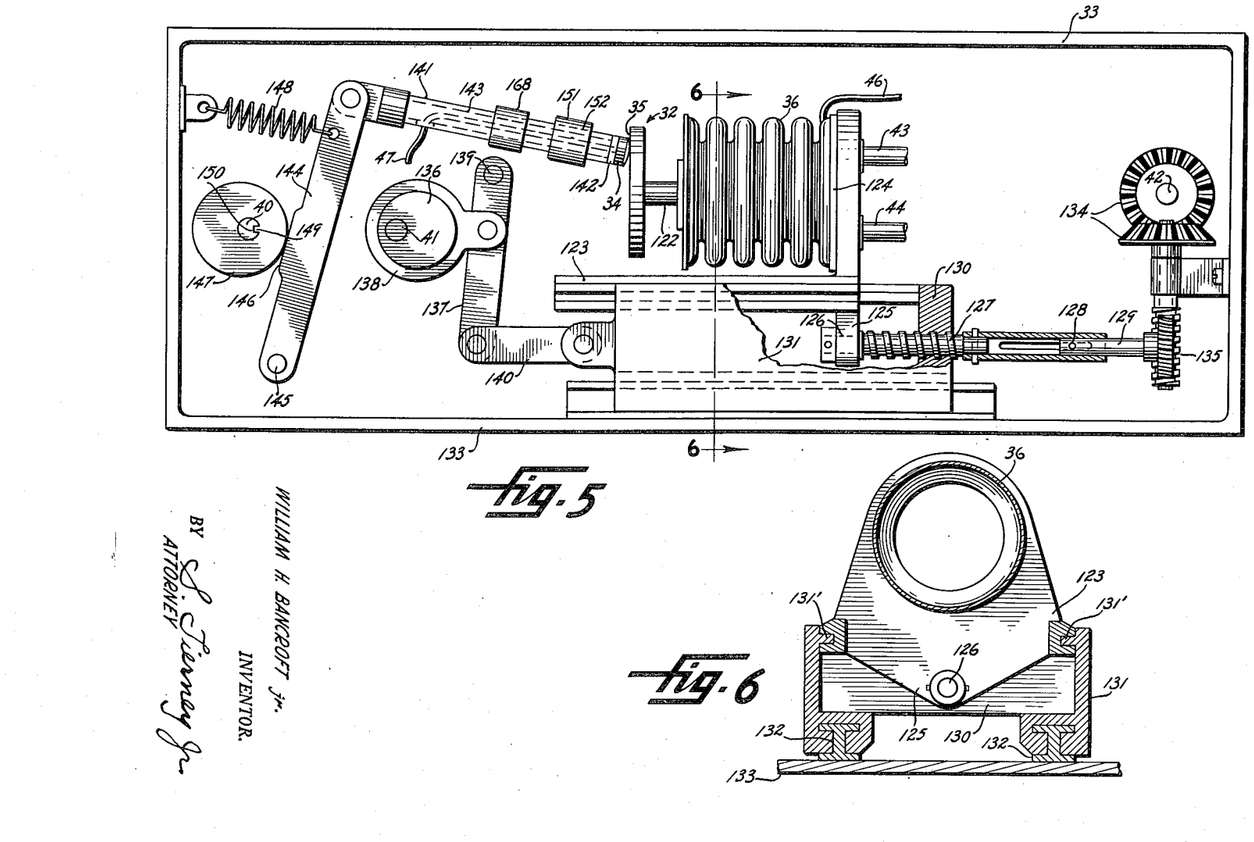
Figure 5 is a top view of an automatic computing pressure actuated switch used with the invention.
Figure 6 is a sectional view on line 6—6 of Figure 5.

Switch contact 34 is supported on the end of a hollow metal rod 141, an insulating gasket 142 being interposed between the rod and contact. Insulation covered wire 47 extends through the bore 143 of rod 141 and its end is connected to contact 34. Rod 141 is connected to a lever 144 having a pivotal support 145, the lever having a raised bearing surface 146 held in engagement with a cam 147 by spring 148. The cam 147 has an integrally formed key 149 which fits closely in a keyway 150 formed in shaft 40, the key and keyway thus serving as an indexing means for securing the cam in a definite position with reference to shaft 40 and its actuating knob 37. Any suitable means, such as a pivotally mounted bearing 151, is used for supporting one end of rod 141 which is slidable in the bore 152 of this bearing. This construction permits a cam 147 which has become damaged or worn out to be readily replaced by a new one. Also should the airplane be redesigned to carry a different gross weight, the cam may be readily removed and replaced by one having a different contour which is suitable for the new weight range.

The lower portion of panel 31 is formed as a separate panel member 153 which serves as the front face of casing 33. Means is provided within casing 33 for approximately indicating speed V to the pilot for any given setting of weight indicating knob 37 (see Figures 2, 8 and 9). For this purpose panel 153 has a window opening 154 through which the speed graduations are visible. These graduations in knots or miles per hour are marked on the front face of a dial 155 secured to the end of a driven shaft 156. Shaft 156 is driven by the speed increasing gearing 157 which is supported for rotation by shafts journaled in a plate 158 extending between the sides of casing 33. The rear face of dial 155 has a circular stabilizing ring 159 located a small distance from a bracket 161 secured to panel 153. Ring 159 serves to add stiffness to graduated dial 155 and dampen and limit its vibration by coming in contact with bracket 161. The input gear 162 of the gear train is driven by a rack 163 formed on a slide 164 slidable in a guide 165 secured to the side of casing 33. One end of slide 164 is pivotally connected by a pin 166 to one end of a drive link 167 whose other end is pivotally secured to a clamp 168 carried by switch adjusting rod 141.

Figure 9:
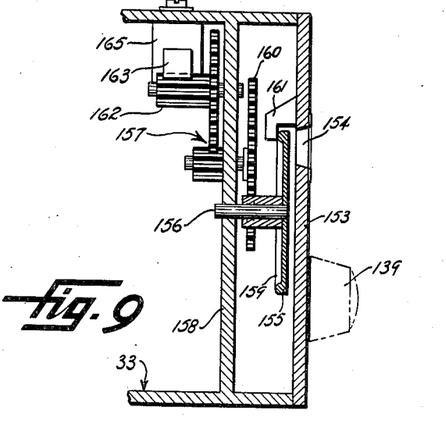
Figure 9 is a side view of the device of Figure 8.

Adjustment of knob 37 before take-off to a setting representing the gross weight of the airplane thus causes the proper setting of switch contact 34 and the indication on dial 155 through window 154 of the speed V at sea level. The reading on dial 155 thus serves as a check on speed V as obtained from a table in the pilot's hand book for this model of airplane at sea level. The indicating lamps above referred to are preferably of the jeweled indicating type.

Figure 12:
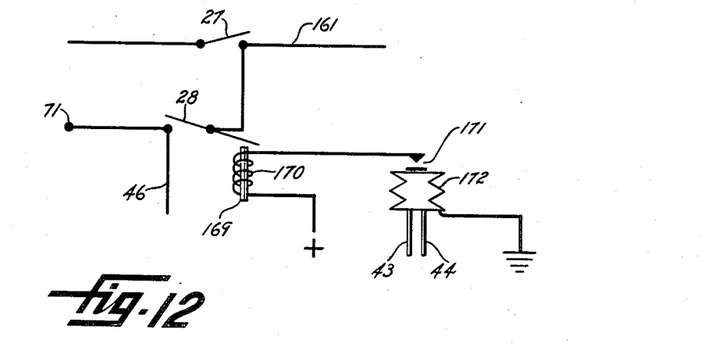
Figure 12 is a schematic circuit diagram of an alternative control circuit.

Figure 12 shows a circuit for automatically opening switch 28 of Figure 1 so that in case the pilot does not open this switch after a normal take-off, the power source 15 will not be fired automatically.

In this arrangement, the switch is pulled to the open position by a solenoid 169 whose coil 170 is connected with a switch 171 which is opened and closed by bellows 172. Pressure is supplied to the bellows by tubes 43—44, the arrangement being such that switch 171 is closed and switch 28 opened at the climb out speed for the take-off gross weight of the plane. After switch 28 is thus opened, it remains open during the flight and should the pilot want charge 15 fired, he does so by pressing manual firing button 57.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and desire to secure by Letters Patent is:

1. Means mounted on an airplane having a power operated means for propelling the airplane along a runway at an accelerating speed comprising: a source of electric current; an electrical indicating device located adjacent the pilot; an electrical energizing circuit connected to said current source and the terminals of said indicating device and including a pair of normally open switch contacts; a closed expansible chamber having a movable wall supporting one of said switch contacts; a tube terminating in said chamber and arranged to transmit thereto a pressure which increases with the speed of the airplane and is sufficient to move said wall and bring said switch contacts into engagement to close said circuit and thereby energize said indicating device when the speed of the airplane reaches a predetermined value.

2. Means mounted on an airplane having a right hand engine propelling unit and a left hand engine propelling unit adapted to propel the airplane along a runway at an accelerating speed, said means comprising: torque switches connected to the engines and having normally open electrical contacts when the engines are operating at or above a predetermined speed; a propellant oriented to generate a forward thrust sufficient to further accelerate the airplane and establish a desired rate of climb; first and second electrical relays having normally open contacts; a series circuit including a current generator, the contacts of said relays, and an igniting member constructed to fire said propellant; means electrically connected to said current generator and automatically responsive to a predetermined speed of the airplane to cause the operation of said first relay and the closing of the contacts thereof; and means electrically connected to said current generator and responsive to the closure of the torque switch of either engine due to the slowing down of an engine for causing the operation of said second relay, the closure of the contacts of said second relay causing the passage of current from said current generator through said igniting member and the firing of said propellant.

3. A propelling unit as claimed in claim 2; in which an electrical indicating device is electrically connected in series with each of said torque switches whereby the closing of a torque switch and the operation of its indicating device notifies the pilot which of the engines has failed.

4. Means for securing take-off of an airplane having an engine driven propeller adapted to accelerate the speed of the airplane comprising: a propellant oriented to generate a forward thrust sufficient to further accelerate the airplane and establish a desired rate of climb; an electrical energizing circuit including a source of electric current, a pair of normally open switch contacts and a relay; a closed expansible chamber having a movable wall supporting one of said switch contacts; a tube having one end terminating in said chamber and its opposite end disposed in the airstream of said propeller, the slowing down of said propeller due to partial engine failure causing movement of said wall to bring said switch contacts into engagement and cause current from said source to operate said relay; and means responsive to the operation of said relay for firing said propellant.

5. Means for securing take-off of an airplane having a jet engine adapted to accelerate the speed of the airplane along a runway comprising: a propellant oriented to generate a forward thrust sufficient to further accelerate the airplane and establish a desired rate of climb; first and second relays having normally open switch contacts; a source of electric current; an electrical energizing circuit including said current source and the normally open contacts of said relays; means automatically responsive to a predetermined speed of the airplane along the runway for causing the operation of said first relay and thereby closing its contacts; and means disposed in the engine combustion chamber and responsive to partial engine failure for causing the operation of said second relay and the closing of its contacts; and means responsive to the flow of current in said energizing circuit for firing said propellant.

6. Means for securing take-off of an airplane from a runway of substantial length, comprising: at least three engines; separate propelling means connected to each engine for propelling the airplane along the runway at an accelerating speed; a propellant supported by the airplane and oriented, upon being fired, to generate a forward thrust which, together with that of said propelling means, makes the airplane air-borne and establishes a rapid rate of climb; an igniter for firing said propellant; a source of electric current; a first relay having normally open contacts; a second relay having normally open contacts; an electrical energizing circuit including the series connection of said current source, the contacts of said relays and said igniter; means responsive to a predetermined speed of the airplane along the runway for causing the operation of said first relay and the closure of its contacts; and means responsive to the slowing down of at least two engines for causing the operation of said second relay and the closure of its contacts thereby establishing the flow of current in the energizing circuit and the consequent firing of the propellant.

7. Means for securing take-off of an airplane from a runway comprising: power operated means for propelling the airplane along the runway at an accelerating speed; a propellant supported by the airplane and oriented to generate a forward thrust sufficient to further accelerate the airplane and establish a high rate of climb; an igniter arranged to fire said propellant; an electrical circuit including a source of voltage connected to said igniter; a control member supported for movement from a first limit position to a second limit position; means automatically responsive to a predetermined high speed of the airplane for moving said control member from the first into the second position; and means controlled by said control member in response to its movement into the second position for causing electrical current from said voltage source to pass through said circuit and igniter and fire said propellant.

8. Means mounted on an airplane having power operated means for propelling the airplane along a runway at an accelerating speed comprising: a propellant oriented to generate a forward thrust sufficient to further accelerate the airplane and establish a high rate of climb; an igniter positioned to fire said propellant; an electrical relay having a winding and a pair of normally open contacts; an electrical circuit including a voltage source connected to said contacts and igniter; and means automatically responsive to a predetermined high speed of the airplane for causing electrical current from said voltage source to flow through said winding to operate said relay and close its contacts, whereby current from said voltage source heats said igniter to fire said propellant.

9. Means mounted on an airplane having a right hand engine propelling unit and a left hand engine propelling unit adapted to propel the airplane along a runway at an accelerating speed; a movable control member; means responsive to the slowing down of the right hand engine after the airplane has started down the runway for moving said control member; a second movable control member; means responsive to the slowing down of the left hand engine after the airplane has started down the runway for moving said second control member; a propellant supported on the airplane and oriented to generate a forward thrust sufficient to further accelerate the airplane and establish a desired rate of climb; and means responsive to the movement of either of said control members after the airplane has reached a predetermined speed for firing said propellant.

10. An aircraft comprising a rocket motor containing propellant material and oriented to produce forward thrust; a source of electrical energy; first and second electrical circuits connected to said source, said first circuit including a first switch and firing means, said means being disposed in said rocket motor; said second circuit including a second switch and a relay, said relay being operatively connected to said first switch; a closed expansible chamber having a movable wall portion connected to said second switch; and a tube terminating at one end in said chamber and at the other end in a forwardly facing opening outside the aircraft, whereby when the aircraft attains a predetermined air-speed said chamber will expand closing said second switch and said second and first circuits will be closed successively to energize said firing means and actuate said rocket motor.

11. An aircraft comprising an auxiliary thrust unit containing propellant material and oriented to produce forward thrust; a source of electrical energy; first and second electrical circuits connected to said source, said first circuit including a first switch and electrically energized means for firing said propellant; said second circuit including a relay and a pair of normally spaced apart switch contacts, said relay being operatively connected to said first switch; a closed expansible chamber having a movable wall supporting one of said switch contacts; a manually adjustable control member located convenient to the pilot; drive means connecting said control member to one of said switch contacts to adjust the initial spacing between said contacts; and a tube terminating at one end in said chamber and at the other end in a forwardly facing opening outside the aircraft, whereby when the aircraft attains a predetermined airspeed said chamber will expand causing said switch contacts to engage and said second and first circuits will be closed successively to energize said firing means and actuate said auxiliary thrust unit.

12. Means mounted on an airplane having a power operated means for propelling the airplane along a runway at an accelerating speed comprising: a propellant oriented to generate a forward thrust sufficient to further accelerate the airplane and establish a desired rate of climb; a source of electric current; a plurality of movable switch contacts; a conductor connecting said contacts to said current source; a plurality of fixed switch contacts adapted to be engaged by said movable switch contacts; means operatively connected with said movable contacts to cause said movable contacts to engage their fixed contacts successively as the airplane attains continually increasing speeds; a relay; a circuit including a switch arm settable by the pilot to connect either of said fixed switch contacts to said relay; and means responsive to the operation of said relay for firing said propellant.

13. Means mounted on an airplane having a power operated means for propelling the airplane along a runway at an accelerating speed comprising: a propellant oriented to generate a forward thrust sufficient to further accelerate the airplane and establish a desired climb out speed; a source of current; a relay; an igniter for firing said propellant; a normally open first circuit connecting said current source to the contacts of said relay and said igniter; a second circuit connecting said relay to said current source, said second circuit including a switch arranged to be closed by the pilot before take-off; means responsive to a predetermined speed of the airplane along the runway which is less than the climb out speed for closing said second circuit to operate said relay; means responsive to failure of said power operated means for closing said first circuit after the operation of said relay; and means responsive to the climb out speed for opening said switch to prevent current flow in said second circuit.

WILLIAM H. BANCROFT, Jr.

References Cited in the file of this patent

UNITED STATES PATENTS

| Number | Name | Date |
| --- | --- | --- |
| 2,529,503 | MacDonald | Nov. 14, 1950 |

OTHER REFERENCES

"Flight," Issue of March 8, 1945, pp. 250–253.